(12) United States Patent  (10) Patent No.: US 8,645,615 B2
Post et al.  (45) Date of Patent: Feb. 4, 2014

(54) SYSTEMS AND METHODS FOR HANDLING NON-VOLATILE MEMORY OPERATING AT A SUBSTANTIALLY FULL CAPACITY

(75) Inventors: Daniel J. Post, Cupertino, CA (US); Nir J. Wakrat, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 417 days.

(21) Appl. No.: 12/964,423

(22) Filed: Dec. 9, 2010

(65) Prior Publication Data

US 2012/0151120 A1    Jun. 14, 2012

(51) Int. Cl.
G06F 12/00      (2006.01)
(52) U.S. Cl.
USPC ............................................. 711/103
(58) Field of Classification Search
None
See application file for complete search history.

(56) References Cited

U.S. PATENT DOCUMENTS

| | | |
|---|---|---|
| 5,604,906 A | 2/1997 | Murphy et al. |
| 5,940,866 A | 8/1999 | Lee et al. |
| 5,991,542 A | 11/1999 | Han et al. |
| 6,377,500 B1 | 4/2002 | Fujimoto et al. |
| 6,839,827 B1 | 1/2005 | Beardsley et al. |
| 6,901,479 B2 | 5/2005 | Tomita |
| 7,509,474 B2 * | 3/2009 | Wong ............................ 711/206 |
| 2008/0144142 A1 | 6/2008 | Reece |
| 2008/0307175 A1 | 12/2008 | Hart et al. |
| 2008/0307188 A1 * | 12/2008 | Franaszek et al. ............ 711/171 |
| 2011/0010496 A1 * | 1/2011 | Kirstenpfad et al. ......... 711/114 |
| 2011/0302354 A1 * | 12/2011 | Miller ........................... 711/103 |

* cited by examiner

Primary Examiner — Brian Peugh
(74) Attorney, Agent, or Firm — Van Court & Aldridge LLP

(57) ABSTRACT

This can relate to handling a non-volatile memory ("NVM") operating at a substantially full memory. The non-volatile memory can report its physical capacity to an NVM driver. The NVM driver can scale-up the physical capacity a particular number of times to generate a "scaled physical capacity," which is then reported to the file system. Because the scaled physical capacity is greater than the NVM's actual physical capacity, the file system allocates a logical space to the NVM that is substantially greater than the NVM's capacity. This can cause less crowding of the logical block addresses within the logical space, thus making it easier for the file system to operate and improving system performance. A commitment budget can also be reported to the file system that corresponds to the NVM's physical capacity, and which can define the amount of data the file system can commit for storage in the NVM.

19 Claims, 5 Drawing Sheets

SYSTEMS AND METHODS FOR HANDLING NON-VOLATILE MEMORY OPERATING AT A SUBSTANTIALLY FULL CAPACITY

FIELD OF THE INVENTION

Systems and methods are described for handling non-volatile memory ("NVM") operating at a substantially full capacity. In particular, by providing a logical space for the NVM that is relatively larger than the physical capacity of the NVM, the system's performance can be increased even when the NVM is substantially full.

BACKGROUND OF THE DISCLOSURE

Non-volatile memory ("NVM"), such as NAND flash memory, is commonly used for mass storage. For example, consumer electronics such as portable media players or cellular telephones often include flash memory to store data such as music, videos, and other media.

In conventional NVM systems, the translation layer reports the logical capacity of the NVM to the file system, where this logical capacity can correspond to a value smaller than the amount of data the NVM can physically hold. This reduction is done to reserve NVM data space to, for example, accommodate garbage collection, accommodate bad data blocks, and improve system performance by reducing the amount of garbage collection. In conventional direct-mapped disk storage systems, the logical capacity is equal to the media size minus any remapping reserves. When the free space in an NVM becomes low, however, the system may be unable to allocate data pieces into the NVM that are ideally-sized. Thus, the allocated data may need to be fragmented. File systems with a greater amount of fragmentation can perform poorly compared to less-fragmented file systems. This reduction in performance can be caused by, for example, increased seek time on rotational media; increased per-transaction overhead; any serialization or single-dispatch constraints; and increased overhead required for mapping more chunks of data than is ideal.

SUMMARY OF THE DISCLOSURE

Systems and methods are disclosed for handling a non-volatile memory ("NVM") operating at a substantially full capacity. An NVM can report its physical capacity to an NVM interface. The NVM interface can scale-up the reported physical capacity a certain number of times, thus generating a "scaled physical capacity." For example, an NVM can report that its physical capacity is 32 gigabytes. The NVM driver can then scale this value upwards to a scaled physical capacity of 1 terabyte. The scaled physical capacity can then be reported to the file system. Since the file system believes it is working with a larger NVM than it really is (e.g., the file system believes the NVM can hold 1 terabyte of data), the file system can allocate a logical space to the NVM that corresponds to this larger size. Moreover, the scaled physical capacity can be any suitable number of times larger than the physical capacity of the NVM (e.g., including fractional scaling factors). For example, in some embodiments the scaled physical capacity can simply be the maximum logical space available for allocating to the NVM.

Since the logical space is significantly larger than the NVM's physical capacity, there can be ample free addresses in the logical space even when the NVM is nearing full capacity. This can prevent detrimental effects that occur when a logical space approaches full capacity, such as increased data fragmentation, slowed processing capabilities, more frequently required defragmentation, and the like.

In addition to the scaled physical capacity, a commitment budget can also be reported to the file system. The commitment budget can correspond to the NVM's physical capacity (e.g., can correspond to the physical volume of the NVM minus any space reserved for bad blocks, garbage collection, etc.), and can define the amount of data the file system can commit for storage in the NVM. In this manner, by using the scaled physical capacity and the commitment budget, the file system can operate in a larger logical space while still limiting the amount of data stored in the NVM to an amount the NVM can physically hold.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
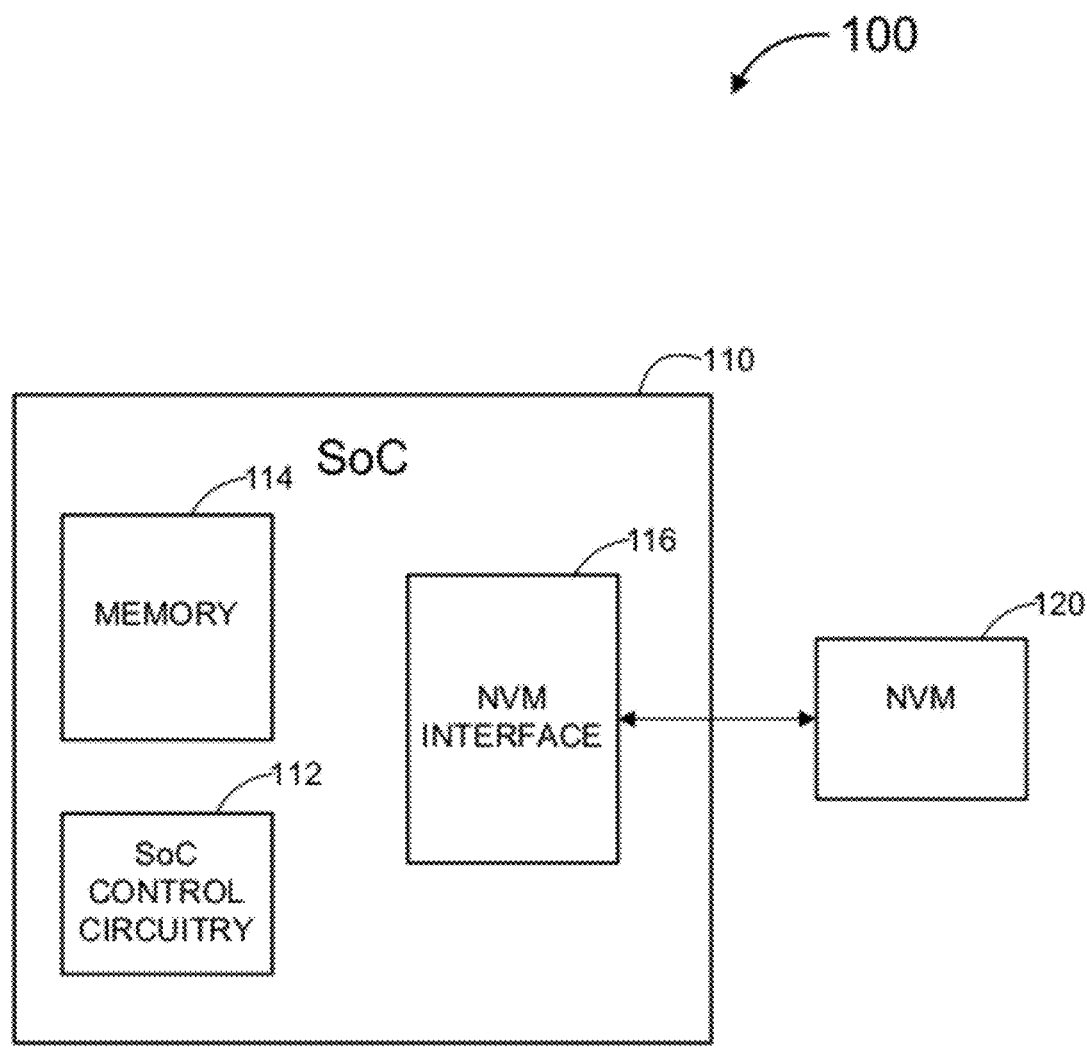
FIGS. 1 and 2 are schematic views of electronic devices configured in accordance with some embodiments of the invention.

Systems and methods for handling non-volatile memory ("NVM") operating at a substantially full capacity are provided herein. In conventional NVM systems, an NVM can report its physical capacity to a file system. As used herein, the term "physical capacity" can refer to the amount of data a memory device can commit to physical storage. For example, the physical capacity of an NVM can refer to the actual physical volume of the NVM minus any data space reserved for system performance, such as data space reserved for garbage collection, reserved for bad data blocks, etc. The file system can then allocate a logical block address ("LBA") range to accommodate the reported physical capacity of the NVM (e.g., can allocate a logical space). As used herein, the term "LBA range" can refer to a range of discrete addresses, where each address can be repeatedly mapped and re-mapped (e.g., as new data is stored) to a physical block or other segment of the NVM's physical memory. For example, the NVM can report that its physical capacity is 5 gigabytes, and the file system may then allocate an LBA range from LBA0-LBA1000 for addressing those 5 gigabytes. As the NVM becomes more full and begins to run out of room, however, the LBA range can also start to run out of room (e.g., there are fewer free addresses in the LBA range to which new data can be assigned). This can cause the file system to have to "work harder" to fit in new pieces of data into the LBA range (e.g., non-optimal file system allocation patterns can result, thus leading to data fragmentation and/or higher management overhead), thereby slowing down the system's performance.

Accordingly, as described herein, in some embodiments an LBA range can be allocated to an NVM that represents a capacity substantially larger than the NVM's physical capacity. Therefore, even when the NVM begins to fill up, there may still be sufficient space in the LBA range to easily address the new pieces of data being stored in the NVM. This, in turn, can reduce data fragmentation and prevent detrimental slowing of the system as the NVM fills up with data.

In particular, in operation two values can be provided to the file system. The first value can be a commitment budget that corresponds to the physical capacity of the NVM (e.g., the physical volume of the NVM minus any data space reserved for garbage collection, bad blocks, etc). In other words, as used herein the term "commitment budget" can define the amount of data the file system can commit for storage in the NVM. The second value can be a "scaled physical capacity" that can correspond to a value sufficiently larger than the physical capacity of the NVM. For example, the scaled physical capacity can be 2 times larger, 3.5 times larger, or any suitable number of times larger than the actual physical capacity of the NVM. In some cases, the scaled physical capacity can simply be the maximum logical space available for allocating to the NVM. The file system can receive the scaled physical capacity and—believing the physical capacity of the NVM is larger than it actually is—can allocate an LBA range to the NVM that corresponds to this larger, scaled physical capacity.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. NVM 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof. In some embodiments, instead of being an integrated memory, NVM 120 can alternatively include a removable memory device. In this case, NVM 120 can include, for example, a Universal Serial Bus ("USB") memory drive, a memory card (e.g., a flash card), or any other suitable removable memory device. FIG. 1, as well as later figures and various disclosed embodiments, may sometimes be described in terms of using flash technology. However, this is not intended to be limiting, and any other type of non-volatile memory can be implemented instead.

NVM 120 can be organized into "blocks", which is the smallest erasable unit. Each block may then be further organized into "pages", which can be the smallest unit that can be programmed or read. In some embodiments, NVM 120 can include multiple integrated circuits (e.g., "dies"), where each integrated circuit may have multiple blocks. The blocks from corresponding integrated circuits (e.g., blocks having the same position or block number) may form "super blocks." Each page (e.g., each page of each block of each die) can correspond to a particular "physical page address" of the NVM, where data can be written to and/or read from the physical page address. Similarly, each block of NVM 120 can be addressed using a "physical block address," where data can be erased from each physical block address. As used herein, the term "physical address" can refer to either a physical page address or a physical block address.

System-on-a-chip 110 can include SoC control circuitry 112, memory 114, and NVM interface 116. While the modules of SoC 110 are shown as separate modules in FIG. 1, this is intended only to simplify the description of the embodiments of the invention. It should be understood that these modules may share hardware components, software components, or both. For example, SoC control circuitry 112 may execute a software-based memory driver for NVM interface 116. Moreover, electronic device 100 and SoC 110 can include any other suitable components (e.g., such as a power supply, any user input or output components, and error correcting code modules), which have not been depicted in FIG. 1 in order to prevent overcomplicating the figure.

SoC control circuitry 112 can control the general operations and functions of SoC 110 and the other components of SoC 110 or electronic device 100. For example, responsive to user inputs and/or the instructions of an application or operating system, SoC control circuitry 112 can issue read or write commands to NVM interface 116 to obtain data from or store data in NVM 120. For clarity, data that SoC control circuitry 112 may request for storage or retrieval may be referred to herein as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operable to drive the functionality of electronic device 100. For example, SoC control circuitry 112 can include one or more processors that operate under the control of software/firmware stored in NVM 120 or memory 114. SoC control circuitry 112 may operate under the control of a program, such as an application, operating system, an NVM driver, or a bootloader loaded in memory 114.

Memory 114 can include any suitable type of volatile or non-volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 116 may include any suitable combination of hardware, software, and/or firmware configured to act as an interface or driver between NVM 120 and SoC control circuitry 112. For any software modules included in NVM interface 116, corresponding program code may be stored in NVM 120 or memory 114.

NVM interface 116 can perform a variety of functions that allow SoC control circuitry 112 to access NVM 120 and to manage the memory locations (e.g., pages, blocks, super blocks, integrated circuits) of NVM 120 and the data stored therein. For example, NVM interface 116 can interpret the read or write commands from SoC control circuitry 112, perform wear leveling, and generate read and write instructions compatible with the bus protocol of NVM 120, and the like. In some embodiments, as described in more detail below with regards to FIG. 2, NVM interface 116 can include an NVM driver for providing access to at least some of the memory locations in NVM 120 through a file system.

Figure 2:
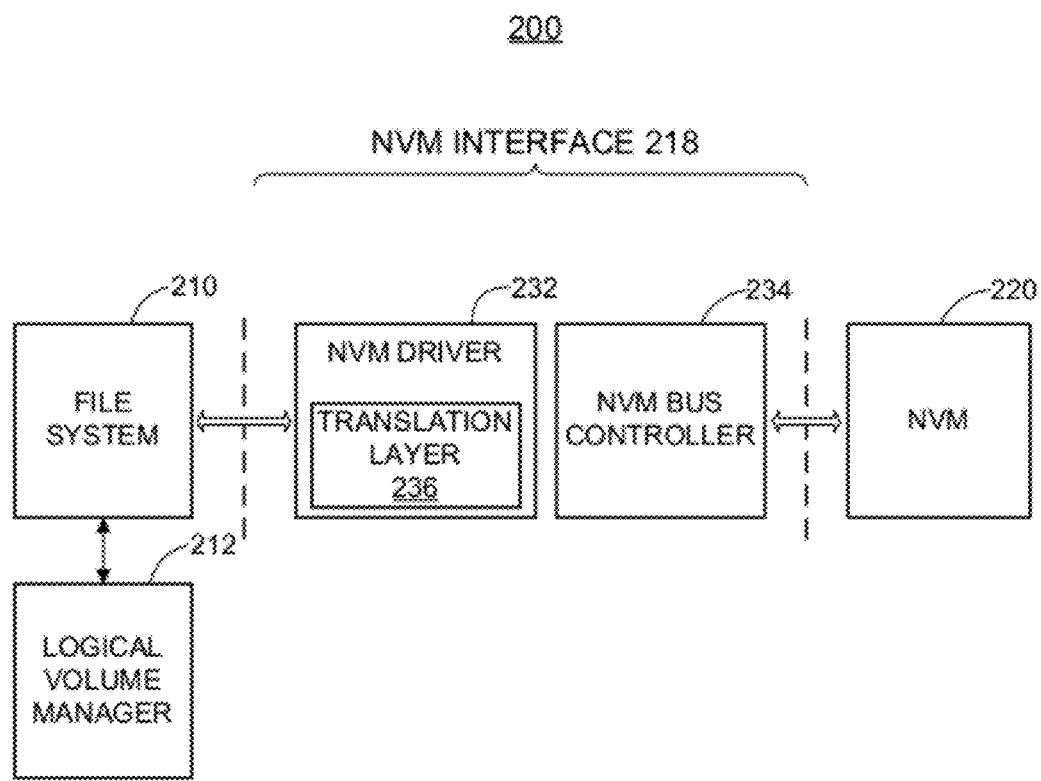

FIG. 2 is a schematic view of electronic device 200, which may illustrate in detail some of the software and hardware components of electronic device 100 (FIG. 1) in accordance with various embodiments. Electronic device 200 may therefore have any of the features and functionalities described above in connection with FIG. 1, and vice versa. Electronic device 200 can include file system 210, NVM interface 218, and NVM 220. NVM interface 218 and NVM 220 may, for example, correspond to NVM interface 116 and NVM 120 of FIG. 1, respectively.

NVM interface 218 can include NVM driver 232 and NVM bus controller 234. NVM driver 232 may be a software module and NVM bus controller 234 may be a hardware module. Accordingly, NVM driver 232 may represent the software aspect of NVM interface 218, and NVM bus controller 234 may represent the hardware aspect of NVM interface 218.

File system 210 may be a software module. In particular, file system 210 can include any suitable type of file system (e.g., such as a File Allocation Table ("FAT") file system or a hierarchical file system ("HFS")), and may be part of the operating system of electronic device 200. In these embodiments, file system 210 may perform some or all of the functionalities of NVM driver 232 discussed below, and therefore file system 210 and NVM driver 232 may or may not be separate modules.

File system 210 may manage file and folder structures for the application and operating system. File system 210 may operate under the control of an application or operating system running on electronic device 200, and may provide read and write commands to NVM driver 232 when the application or operating system requests that information be read from or stored in NVM 220, respectively. Along with each read or write command, file system 210 can provide a "logical address" to indicate where the user data should be read from or written to. For example, such a logical address could include a logical page address or a logical block address with a page offset. As will be described in greater detail below with regards to the following figures and descriptions, file system 210 can also allocate an LBA range to NVM 220 from which the read/write/erase logical addresses are chosen.

In some cases, file system 210 may provide read and write requests to NVM driver 232 that are not directly compatible with NVM 220. For example, the logical block addresses provided by file system 210 may use conventions or protocols typical of hard-drive-based systems. A hard-drive-based system, unlike flash memory, can overwrite a memory location without first performing a block erase. Moreover, hard drives do not need wear leveling to increase the lifespan of the device. Therefore, NVM interface 218 can perform any functions that are memory-specific, vendor-specific, or both to "interpret" requests from file system 210 and perform other management functions in a manner suitable for NVM 220.

NVM driver 232 can include translation layer 236. In some embodiments, translation layer 236 may be a flash translation layer ("FTL") and can perform logical-to-physical address mapping. In other words, translation layer 236 can provide a method of translating logical addresses (e.g., logical page address or logical block addresses) provided by file system 210 into the physical addresses (e.g., a physical page address or a physical block addresses) of NVM 220. For example, on a write operation, translation layer 236 can map the provided logical address to a free, erased physical page address on NVM 220. Similarly, on a read operation, translation layer 236 can use the provided logical address to determine the physical address of the requested data. Since each NVM may have a different physical layout depending on the size or vendor of the NVM, this mapping operation may be memory and/or vendor specific. Translation layer 236 can perform any other suitable functions in addition to logical-to-physical address mapping. For example, translation layer 236 can perform any of the other functions that are typical of flash translation layers, such as garbage collection and wear leveling.

To complete NVM access requests (e.g., write, read, erase requests, etc.), NVM driver 232 may interface with NVM bus controller 234. For example, NVM driver 232 may provide NVM bus controller 234 with the physical address at which to store or retrieve data, and, for write requests, the corresponding data vector to be written. NVM bus controller 234 may act as the hardware interface to NVM 220, and can communicate with NVM 220 using the bus protocol, data rate, and other specifications of NVM 220.

In some embodiments, electronic device 200 can include logical volume manager ("LVM") 212. LVM 212 can be a software module, a hardware module, or a combination of the two. LVM 212 can manage the memory or other storage components of electronic device 200 by, for example, creating partitions, resizing partitions, creating memory backups, mirroring stored data, and the like. As will be described in greater detail in the descriptions to follow, LVM 212 may also dynamically increase and decrease the size of a logical space allocated to a non-volatile memory. Although LVM 212 is shown communicating with file system 210, LVM 212 may be included as part of NVM interface 218 or included any where else in electronic device 200.

Figure 3:
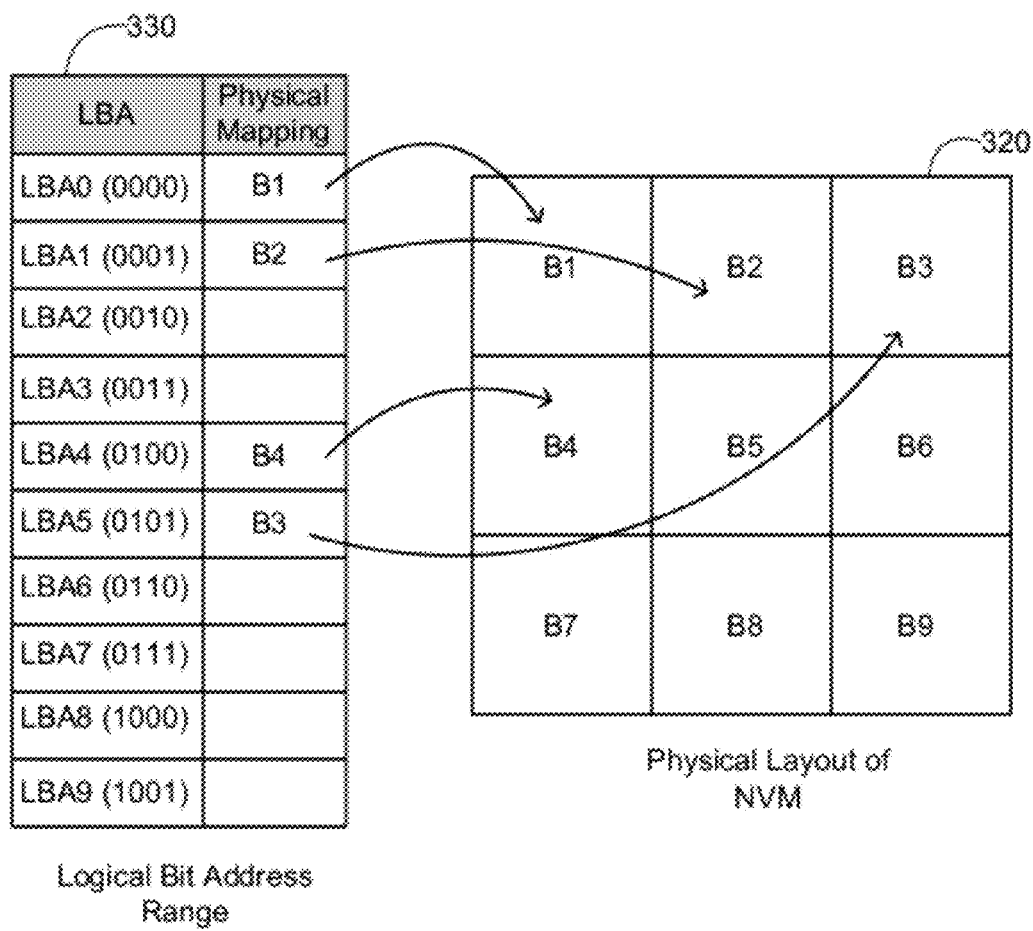
FIG. 3 is a schematic view of an illustrative NVM physical layout and associated LBA range in accordance with some embodiments of the invention.

As mentioned above, a file system can also be responsible for allocating a suitable LBA range to an NVM. In other words, the allocated LBA range can represent the "logical space" in which the file system operates. To illustrate this concept, FIG. 3 shows an exemplary physical layout for NVM 320 and an exemplary LBA range. NVM 320 can include various memory segments physically laid out on the NVM. For example, NVM 320 is illustrated as being broken up into blocks of memory: B1, B2, B3, and so forth. Alternatively, the illustrated memory segments could consist of pages or any other suitable sections of the NVM, and block segments are merely used herein for the purpose of illustration.

Table 330 can show an exemplary LBA range allocated to NVM 320, as well as the physical memory segments currently mapped to particular logical addresses in the LBA range. Based on the physical capacity of NVM 320, the file system can allocate a particular LBA range to NVM 320. For example, FIG. 3 illustrates that an LBA range from LBA0 to LBA9 is allocated to NVM 320.

In operation, when reading, writing, or otherwise interfacing with the data of NVM 320, the file system can provide a desired logical block address from the allocated LBA range. For example, in the illustration of FIG. 3, the file system can provide logical block address "LBA1" along with an erase command to delete the memory stored in segment B1 of NVM 320 (e.g., can provide the logical block address and erase command to an NVM interface). As another example, the file system can provide the logical block address "LBA2," a write command, and a desired piece of data in order to write that data to LBA2. A translation layer (e.g., translation layer 236 of FIG. 2) or other suitable component can perform the necessary logical address-to-physical address mapping when providing the file system's commands to NVM 320. In this manner, the physical details of the NVM can be hidden from the operating system or other software of the electronic device.

In some cases, an LBA range can be provided for an NVM that includes a logical space the same size as the physical capacity of the NVM. In other words, there are just enough logical block addresses in the LBA range to address all data in the NVM when the NVM is completely full. However, in this case, as the NVM begins to approach full capacity, there are fewer and fewer available logical block addresses in the LBA range. Since there are fewer available logical block addresses, the file system may need to perform non-optimal logical address allocations to new data or otherwise routinely reorganize the logical block addresses. Moreover, since there may not be many adjacent logical block addresses remaining, data may need to be fragmented in the LBA range as it is stored. This can cause the overall system to slow down significantly. Especially in the case of media files, the bandwidth (e.g., speed) at which the media can play can become significantly reduced as more time is required to accesses the fragmented pieces of memory. Moreover, since the fragmented media may noticeably skip or pause as it is played, the slowed processing can be readily apparent to an end user.

The complications that can arise as a logical space becomes filled up can be illustrated in laymen's terms by thinking of the logical space of the LBA range as a room. The data addressed by the logical space can be thought of as furniture. As more and more furniture is put in the room, it can become harder and harder to fit in additional pieces of a furniture. A person (e.g., the file system), may have to perform more tasks such as repeatedly re-organizing the furniture in order to fit in a new piece of furniture, thus expending additional time and energy. If the new piece of furniture is large in size (e.g., is a large piece of data), this can also increase the difficulty in placing the new piece of furniture into the room. Moreover, even if there is enough net free space in the room to fit the new piece of furniture, the free space can be located in small pockets scattered around the room. Thus, in some cases the only way to fit the new piece of furniture into the room may be by breaking (e.g., fragmenting) the furniture into pieces. In a similar manner, as the logical space associated with an NVM fills up, the file system may need to perform more operations and spend more time to fit new data into the logical space, and/or may need to more frequently reorganize and fragment the data.

Accordingly, in some embodiments a logical space can be provided for an NVM that is larger than the physical capacity of that NVM. For example, an LBA range can be provided for the NVM that corresponds to a physical capacity which is two times greater, five times greater, or any suitable number of times greater than the physical capacity of that NVM (e.g., including fractional number-of-times). Thus, even when the NVM is operating at a substantially full capacity, there can still be sufficient room in the logical space to easily and quickly manage the data.

Figure 4:
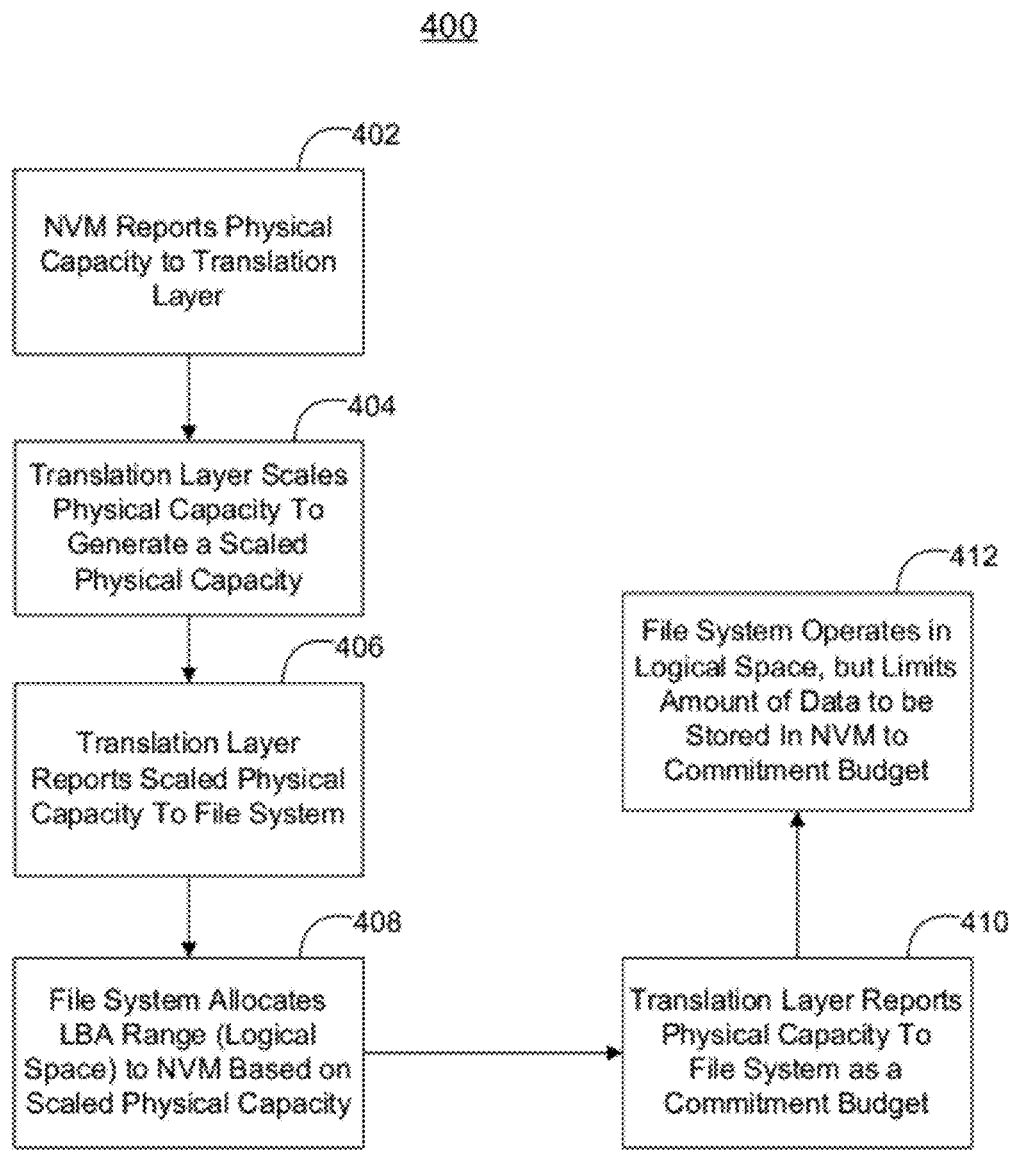
FIG. 4 shows an exemplary process for providing for an increased logical space in accordance with some embodiments of the invention.

To provide for the increased logical space, two values can be reported to the file system: a commitment budget and a scaled physical capacity. As mentioned previously, the commitment budget can refer to the physical capacity of the NVM and the scaled physical capacity can be a scaled-up value of this physical capacity. As an illustration, FIG. 4 shows an exemplary process 400 for providing for an increased logical space.

At step 402, the NVM (e.g., NVM 220 of FIG. 2) can report its physical capacity to the NVM interface. For example, the NVM can report its physical capacity to a translation layer of an NVM interface, such as translation layer 236 of FIG. 2. The physical capacity may, for example, correspond to the actual physical volume of the NVM minus any data space reserved for system performance, such as data space reserved for garbage collection, reserved for bad data blocks, etc.

At step 404, the translation layer can scale the received physical capacity up to a greater value, referred to as the scaled physical capacity. The scaled physical capacity can be any suitable number of times greater than the physical capacity of the NVM, such as 1.5 times, 2 times, 3 times, or any other suitable number of times greater. In some cases the scaled physical capacity can simply be the maximum logical space available for allocating to the NVM. Moreover, in some embodiments, the number of times which the physical capacity is scaled (i.e., the "scaling factor") can be a predetermined number, such that the physical capacity is always scaled by the same amount.

In some embodiments, however, the scaling factor can grow or shrink as necessary, such that the logical space allocated to the NVM can also grow or shrink as necessary. For example, a logical volume manager (e.g., LVM 212 of FIG. 2) or other suitable system can change the logical space based on the needs of the electronic device. As an illustration, the LVM can determine the current size of the logical space is insufficient to prevent the system from slowing down (e.g., due to fragmentation of media files, and the like) and, in response, can increase the size of the logical space. As another illustration, the LVM can dynamically increase the logical space as the NVM becomes more full and decrease the logical space as the NVM becomes more empty. In this case, a nearly empty NVM may have a scaling factor close to one (e.g., the logical space is substantially the same size as the physical capacity of the NVM) while a substantially full NVM may have a relatively large scaling factor.

Regardless of the amount by which it is scaled, the translation layer can report the scaled physical capacity to the file system (e.g., file system 210 of FIG. 2) at step 406. At step 408, the file system can allocate an LBA range to the NVM that is based on the scaled physical capacity. Accordingly, the logical space represented by the allocated LBA range can also be greater than the physical capacity of the NVM by the scaling factor.

The translation layer can also report the physical capacity to the file system for use as a commitment budget (step 410). In this manner, as shown by step 412, the file system can limit the amount of data that is stored in the NVM to the commitment budget. This in turn ensures that the file system does not attempt to store more data in the NVM than the NVM can physically hold. However, the file system can operate in the larger logical space, thus giving the file system more "room" in which to manage and organize the logical block addresses of the NVM's data.

In this manner, the process illustrated by process 400 can allow a file system to more readily handle memory management while helping to avoid fragmentation of the data. In other words, larger chunks of data can more easily be stored in adjacent logical block addresses, thus providing benefits such as flatter trees and faster more seamless playback of media files. Similarly, as another benefit, it may not be necessary to defragment the data as often as a memory system operating without a larger logical space. Furthermore, since process 400 can generally be implemented in memory systems without necessitating additional hardware, this technique can be relatively inexpensive to implement.

In some cases, variations can occur between what data the file system thinks is stored and what the NVM is actually storing. For example, errors can occur when files are deleted, or the system may simply "forget" that data has been erased. This can result in the logical block addresses not being correctly updated and/or the NVM storing data that is no longer desired by the system. Thus, reconciliation processes can be performed to compare what information the system desires to keep to what is actually being stored by the NVM.

In particular, such reconciliation processes can ensure the file system and the NVM are on same terms with regards to the commitment budget. For example, as used herein the amount of data currently written to the NVM can be referred to as the "commitment value." To ensure the NVM is not requested to store more data than it can physically hold, the commitment value should not exceed the commitment budget. However, due to the errors described above, a file system and/or NVM may think the commitment value is larger or smaller than it actually is. This may cause detrimental results such as, for example, the file system requesting to store data in the NVM when the NVM is actually full, the file system refraining from storing data in the NVM because it incorrectly believes the NVM is full, the NVM believing it is full and refusing to store data when in actuality the NVM should have free space, etc.

Figure 5:
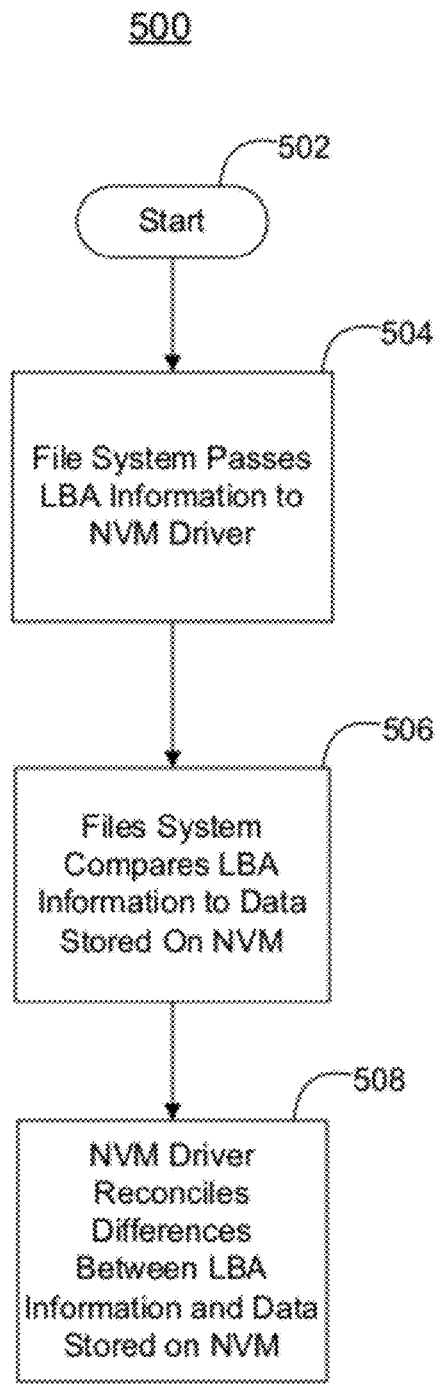
FIG. 5 shows an exemplary reconciliation process for resolving data differences between a file system and an NVM in accordance with some embodiments of the invention.

FIG. 5 shows reconciliation process 500 for resolving any data differences between a file system and an NVM. Reconciliation process 500 can begin at step 502, which can initiate at any suitable time. For example, the reconciliation process can be initiated at system bootup, on a periodic basis, when system memory errors are encountered, any combination of the above.

At step 504, the file system (e.g., file system 210 of FIG. 2) can pass the LBA information to the NVM interface. For example, the LBA information can be passed to NVM driver 232 of NVM interface 218 of FIG. 2. The LBA information can include, for example, a listing of all logical block addresses in the LBA range allocated to the NVM (e.g., NVM 220 of FIG. 2), and what information is supposedly stored therein. As another example, the LBA information can more generally include a listing of which logical block addresses supposedly have stored data. The NVM driver can then compare the LBA information to the data actually stored on the NVM (step 506) and reconcile the differences between the two (step 508). For example, the NVM driver can delete any data stored in the NVM which is not listed in the LBA information, can delete logical block address information for which no data exists in the NVM, and the like.

In this manner, reconciliation process 500 can provide a manner of feedback to ensure the file system and NVM have the same understanding of what files are stored in the NVM. This can help avoid undesirable situations such as when the file system thinks the NVM has free space and thus asks the NVM to write data, and the NVM driver responds by incorrectly saying the NVM is full. The reconciliation process can also aid the NVM and file system in having the same understanding of the commitment budget and commitment value (e.g., how much data is or should be currently stored in the NVM).

It should be understood that the processes described above are merely illustrative. Any of the steps may be removed, modified, or combined, and any additional steps may be added or steps may be performed in different orders, without departing from the scope of the invention. For example, in process 400, steps 406 and 410 (e.g., reporting the scaled physical capacity and the commitment budget to the file system) can be performed at the same time, or any other suitable steps can be performed in a different order and/or simultaneously.

The described embodiments of the invention are presented for the purpose of illustration and not of limitation.

What is claimed is:

1. A system comprising:
a non-volatile memory ("NVM");
an NVM interface operable to:
receive an NVM physical capacity value from the NVM;
scale the NVM physical capacity value upwards to generate a scaled capacity value; and
report the NVM physical capacity value and the scaled capacity value to a file system; and
the file system operable to:
allocate a logical block address ("LBA") range to the NVM that corresponds to the scaled capacity value; and
use the NVM physical capacity value as a commitment budget, such that the file system does not request to store more data in the NVM than defined by the commitment budget.

2. The system of claim 1, wherein the NVM comprises a NAND flash memory.

3. The system of claim 1, wherein the NVM interface comprises a translation layer operable to perform the receiving, scaling, and reporting.

4. The system of claim 1, wherein the physical capacity corresponds to a range of physical block addresses of memory segments of the NVM, and wherein the LBA range is greater than the range of physical addresses.

5. The system of claim 1, wherein the scaled capacity value corresponds to a maximum logical space available for allocating to the NVM.

6. The system of claim 1, further comprising:
a logical volume manager ("LVM") operable to:
monitor the system; and
dynamically change the LBA range based on the monitoring.

7. The system of claim 6, wherein the LVM is further operable to:
determine the NVM is storing a relatively small amount of data; and
reduce the LBA range in response to the determining.

8. The system of claim 6, wherein the LVM is further operable to:
determine the NVM is storing a relatively large amount of data; and
increase the LBA range in response to the determining.

9. The system of claim 6, wherein the LVM is further operable to:
determine the file system is fragmenting more than a predetermined amount of data in the LBA range; and
increase the LBA range in response to the determining.

10. The system of claim 6, wherein the LVM is further operable to:
determine system performance has slowed below a predetermined factor due to data fragmentation; and
increase the LBA range in response to the determining.

11. A method for allocating a logical space to a non-volatile memory ("NVM") of a system, the method comprising:
receiving a physical capacity value from the NVM;
reporting a scaled physical capacity value to a file system of the system, the scaled physical capacity value being a predetermined number of times larger than the received physical capacity value;
generating a logical space based on the scaled physical capacity value;
reporting the received physical capacity value to the file system for use as a commitment budget; and
enabling the file system to operate in the logical space, but limiting a quantity of data to be stored in the NVM to the commitment budget.

12. The method of claim 11, wherein the received physical capacity value corresponds to an amount of data the NVM can physically store minus data space reserved for NVM system performance.

13. The method of claim 11, wherein the receiving, the reporting a scaled physical capacity value, and the reporting the received physical capacity are performed by an NVM interface of the system.

14. The method of claim 11, wherein the generating a logical space is performed by the file system.

15. The method of claim 11, wherein the logical space is the predetermined number of times larger than the physical capacity of the NVM.

16. The method of claim 11, wherein the logical space comprises a range of logical block addresses for use in logically addressing data stored in the NVM.

17. The method of claim 11, further comprising:
receiving logical block address ("LBA") information from the file system, wherein the LBA information defines logical block addresses at which the file system believes the NVM is storing data; and
reconciling differences between the logical space and the NVM based on the received LBA information.

18. The method of claim 17, wherein the receiving the LBA information and the reconciling are performed by an NVM interface of the system.

19. The method of claim 17, wherein the reconciling differences comprises at least one of deleting data stored in the NVM that is not defined by the LBA information and deleting data in the logical space for which no corresponding data is stored in the NVM.

\* \* \* \* \*